US011248177B2

(12) United States Patent
Taylor

(10) Patent No.: US 11,248,177 B2
(45) Date of Patent: Feb. 15, 2022

(54) PURIFICATION OF HYDROCARBONS

(71) Applicant: John Taylor, Amersham (GB)

(72) Inventor: John Taylor, Amersham (GB)

( * ) Notice: Subject to any disclaimer, the term of this patent is extended or adjusted under 35 U.S.C. 154(b) by 0 days.

(21) Appl. No.: 16/959,945

(22) PCT Filed: Jan. 23, 2019

(86) PCT No.: PCT/GB2019/050176
§ 371 (c)(1),
(2) Date: Jul. 2, 2020

(87) PCT Pub. No.: WO2019/155183
PCT Pub. Date: Aug. 15, 2019

(65) Prior Publication Data
US 2021/0071093 A1   Mar. 11, 2021

(30) Foreign Application Priority Data

Feb. 12, 2018   (GB) .................................... 1802236

(51) Int. Cl.
| C10G 27/12 | (2006.01) |
| C10G 32/02 | (2006.01) |
| C10G 1/10 | (2006.01) |
| B09B 3/00 | (2022.01) |
| C10B 53/07 | (2006.01) |
| C10B 55/02 | (2006.01) |
| C10G 53/14 | (2006.01) |

(52) U.S. Cl.
CPC ............ *C10G 27/12* (2013.01); *B09B 3/0083* (2013.01); *C10B 53/07* (2013.01); *C10B 55/02* (2013.01); *C10G 1/10* (2013.01); *C10G 32/02* (2013.01); *C10G 53/14* (2013.01); *C10G 2300/1003* (2013.01); *C10G 2300/1007* (2013.01); *C10G 2300/202* (2013.01)

(58) Field of Classification Search
CPC ............ C10G 1/10; C10G 27/12; C10G 32/02
See application file for complete search history.

(56) References Cited

U.S. PATENT DOCUMENTS

| 1,954,488 | A | * | 4/1934 | Morrell | .................. | C10G 27/12 208/276 |
| 3,111,473 | A | | 11/1963 | Gragson et al. | | |
| 3,616,375 | A | * | 10/1971 | Inoue | ..................... | C10G 32/04 204/157.61 |
| 4,092,128 | A | | 5/1978 | Harris et al. | | |
| 2017/0306245 | A1 | * | 10/2017 | Lindberg | ............... | C10G 32/02 |

FOREIGN PATENT DOCUMENTS

| CN | 103387845 A | 11/2013 | |
| CN | 104673427 A | 6/2015 | |
| CN | 106336889 A | 1/2017 | |
| GB | 689394 A | * 3/1953 | ............. C10G 32/02 |
| GB | 689394 A | 3/1953 | |
| JP | S52114566 A | 9/1977 | |
| JP | 2005015522 A | 1/2005 | |
| WO | 2009/039020 A1 | 3/2009 | |

OTHER PUBLICATIONS

International Search Report and Written Opinion issued for PCT/CN2019/050176, dated Jun. 18, 2019.
Search Report issued for GB1802236.8, dated Mar. 21, 2018.
Search Report issued for GB1802236.8, dated Jun. 16, 2020.

* cited by examiner

*Primary Examiner* — Randy Boyer
(74) *Attorney, Agent, or Firm* — Westman, Champlin & Koehler, P.A.; Z. Peter Sawicki; Amanda M. Prose

(57) ABSTRACT

We disclose a process for purification of hydrocarbons, suitable for a wide range of contexts such as refining bunker fuels to yield low-sulphur fuels, cleaning of waste engine oil (etc) to yield a usable hydrocarbon product, recovery of hydrocarbons from used tyres, recovery of hydrocarbons from thermoplastics etc, as well as the treatment of crude oils, shale oils, and the tailings remaining after fractionation and like processes. The method comprises the steps of heating the hydrocarbon thereby to release a gas phase, contacting the gas with an aqueous persulphate electrolyte within a reaction chamber, and condensing the gas to a liquid or a liquid/gas mixture and removing its aqueous component. It also comprises subjecting the reaction product to an electrical field generated by at least two opposing electrode plates between which the reaction product flows; this electrolytic step regenerates the persulphate electrolyte which can be recirculated within the process. The process is ideally applied in an environment at lower than atmospheric pressure, such as less than 1500 Pa. A wide range of hydrocarbons can be treated in this way. Used hydrocarbons such as engine oils and sulphur-contaminated fuels are prime examples, but there are a wide range of others such as hydrocarbons derived from the pyrolysis of a material having a hydrocarbon content. One such example is a mix of used rubber (such as end-of-life tyres) and used oils (such as engine oils, waste marine oils), which can be pyrolysed together to yield a hydrocarbon liquid which can be treated as above, and a residue that provides a useful solid fuel.

23 Claims, 2 Drawing Sheets

PURIFICATION OF HYDROCARBONS

CROSS-REFERENCE TO RELATED APPLICATION

This application is a Section 371 National Stage Application of International Application No. PCT/GB2019/050176, filed Jan. 23, 2019, and published as WO 2019/155183 A1 on Aug. 15, 2019, in English, which claims priority to GB patent application Serial No. 1802236.8, filed Feb. 12, 2018, the contents of which are hereby incorporated by reference in their entirety.

FIELD OF THE INVENTION

The present invention relates to the purification of hydrocarbons contaminated with other solid and liquid materials.

BACKGROUND ART

Hydrocarbons are an essential part of the world economy, and will continue to be so for some time. They are required for a wide range of purposes, including use as fuel, for lubrication, and as a feedstock for chemical production processes.

Increasing environmental regulation aimed at reducing emissions does however require that many of those fuels are at a higher level of purity than has hitherto been the case. For example, so-called "bunker fuels" made up of the heavy oils left as a residue after fractional distillation of lighter fuels have routinely been used for powering shipping vessels but are typically very high in sulphur and other contaminants. Such fuels are now banned from use in 'Emission Control Areas', i.e. defined sea areas around specific jurisdictions such as the EU, USA, Canada and China, unless processed to reduce sulphur and other particulates from 3.5% m/m to 0.10% or less.

Other environmental concerns are based on the finite nature of hydrocarbon reserves, and seek to recover and re-use hydrocarbons where possible. Large volumes of contaminated hydrocarbons are disposed of after having been used as lubricants, tyres, plastics and the like. Many industrial and consumer products contain hydrocarbons that are chemically or physically bonded with other compounds within the product. When a product containing hydrocarbons has reached the end of its useful life, either by contamination, wear, damage or other reason, there is considerable commercial and environmental value in recovering the hydrocarbon content and processing it into new commercial products.

In some countries, end-of-life materials (EOL) are often classified as 'waste' which conveys a legal status on the material, requiring specific handling and treatment. The commercial costs and technical complications of such handling and treatment often result in 'waste' products being inappropriately dumped or incinerated, causing intensive water, ground and air pollution.

In many countries, legislation has banned low level recovery treatments such as incineration for rubbers, plastics and oils. Acid washing and clay filtration processes were historically employed on some oils to recover them for re-use as base oils or as secondary liquid fuels. Those processes caused significant and dangerous emissions to atmosphere or hazardous effluent emissions requiring additional specialised processing.

Where approved systems do not exist for recovering solid hydrocarbons, landfill is often a solution of last resort which itself can create long term hazardous deposits where an extended half-life of hundreds of years is common for rubbers and plastics. Legislation has banned the use of landfill for many products that cannot biodegrade, resulting in alternative process treatments being sought.

One such process is thermolysis, (herein referred to as pyrolysis) which thermally degrades materials at typical temperatures of 350-800 degrees Celsius or higher, in the absence of oxygen to prevent combustion. Pyrolysis is often a slow, simple, low cost technology which technically has advanced very little in the decades since its inception. As a low capital cost process, it has become a favoured treatment for processing rubber (in the form of end of life tyres) and waste plastics, because as the material is thermally degraded, gases are generated which when condensed have a superficial similarity to diesel fuel. A char material similar to carbon black also emanates from the rubber pyrolysis process.

By nature of the technology employed in the design of many simple pyrolysis plants, they are only suitable for batch processing rather than continuous processing. This is wasteful in terms of energy as at the end of a batch, the entire process must be cooled to a temperature that will allow safe unloading of the remaining residue. A high-energy input will be required to elevate the entire process to operating temperature once again.

Where plastic materials are intended for pyrolysis, pre-sorting is traditionally required to ensure that Polyvinylchloride (PVC) material is not processed as this allows chlorinated compounds to be formed which are extremely hazardous to human health and corrosive to materials of construction of the process equipment.

In batch pyrolysis, gases are generated slowly and remain within the pyrolysis chamber (described as dwell time) until sufficient pressure has built up to cause the gases to exit the pyrolysis chamber via pipework usually leading to a condensation process. Dwell times allow multiple gases to mix and for complex gas reactions occur, potentially allowing carcinogenic and other hazardous compounds to be formed. When the gases exit the process and are condensed, the hazardous compounds remain in the hydrocarbon condensate which if then used as a raw fuel, will allow the compounds to be released into the atmosphere creating hazardous airborne emissions.

During the manufacture of rubber products, sulphur is usually added to aid vulcanisation and provide required mechanical properties. The hydrocarbon condensate from rubber pyrolysis will therefore contain virtually the same level of sulphur as originally added. Depending upon the temperature achieved and dwell time during the pyrolysis process, additional sulphur species can be formed which will appear in the hydrocarbon condensate, which if then used as a raw fuel, will allow a high level of sulphur oxides to be generated and released into the atmosphere.

Where complex sulphur and other contaminant species have been allowed to form, it is difficult and energy intensive to re-process the liquid hydrocarbon condensate to remove those contaminants and in laboratory tests, it has been found that the time, energy cost and yield loss significantly negates any commercial value that might have applied to the hydrocarbon condensate as a fuel.

Some naturally arising products (natural gas, crude oil, biomass) can also contain sulphur, organic acids and other contaminants that prevent commercial use of the pyrolysed products without extensive further processing. Where liquids are derived from biomass pyrolysis, they are highly oxygenated which will cause instability and rapid deterioration of the liquid unless it is further processed by hydrotreating with catalysts to remove the excess oxygen. Hydrotreating is extremely energy intensive and results in substantial $CO_2$ emissions.

SUMMARY OF THE INVENTION

A number of needs therefore exist in this area. 'End of life' (EOL) liquid hydrocarbons, and waste materials containing hydrocarbons, need to be disposed of by routes that do not involve disposal into the natural environment. Such a route needs to be economically viable and environmentally positive, thereby reducing ground, water and air emissions that are likely to cause harm to humans, animals and the natural environment.

EOL waste hydrocarbons need to be recovered and processed to yield new forms of usable energy, ideally by a process that has a low energy requirement, low operating cost, prevents hazardous compounds from being created within the process and significantly reduces carbon footprint compared to current practices.

Contaminants need to be removed from naturally arising liquid and gaseous hydrocarbons by an economically viable and environmentally acceptable process that has a low energy requirement, low operating cost and reduces carbon footprint compared to known current practices. In particular, a process is needed by which oxygen and acidic compounds can be removed from biomass pyrolysis distillate.

The present invention therefore seeks to provide a process for purification of hydrocarbons. It can be applied to a wide range of contexts, for example to process or re-process bunker fuels to yield low-sulphur fuels, cleaning of waste engine oils (etc) to yield a usable hydrocarbon product, recovery of hydrocarbons from used tyres, plastics etc, as well as the treatment of crude oils, shale and other solids or near solids containing oils, and the tailings remaining after fractionation, separation and like processes.

Thus, the process is useful for both extraction of hydrocarbons from solid and liquid materials, and the removal or reduction of contaminants such as Sulphur, halogens, Nitrogen, metals, chars, ash and the like.

In its first aspect, the present invention therefore provides a method of treating hydrocarbons comprising the steps of heating the hydrocarbon thereby to release a gas phase, contacting the gas with of an aqueous persulphate electrolyte, condensing the gas to a liquid or a liquid/gas mixture, and removing its aqueous component.

The persulphate electrolyte is thus able to react with contaminants in the hydrocarbon (such as sulphur-containing impurities in the hydrocarbon which are oxidised to sulphates) and draw them into solution in an aqueous phase together with the remaining persulphate. Separation of an aqueous phase from a hydrocarbon phase is relatively straightforward, and will then take with it the contaminants leaving behind a cleaner hydrocarbon. Thus, the separation step removes the aqueous component and recovers the hydrocarbon condensate as a low sulphur fluid.

Contact between the gas and the aqueous persulphate electrolyte can be by spraying the electrolyte into the gas or a stream of the gas, or by bubbling the gas through the electrolyte in solution, or by other means.

Separation can be by way of a mechanical means such as are known in the art. Following separation, the hydrocarbon liquid is admixed with a polar aprotic solvent so that non sulphated polar contaminants in the hydrocarbon phase are attracted to and dissolved into the solvent and then passed to a solvent recovery process such as a vacuum distillation step.

The aqueous persulphate electrolyte can be held in a reservoir prior to being contacted with the gas phase hydrocarbon. In this case, we prefer that the reservoir is maintained at a temperature of less than about 50, ideally less than 30 degrees Celsius.

The hydrocarbon is preferably supplied in a continuous stream, to which the method is then applied.

In its second aspect, the present invention provides a method of treating liquid hydrocarbons, comprising reacting the hydrocarbon with a persulphate thereby to oxidise sulphur-containing species in the hydrocarbon and subjecting the reaction product to an electrical field generated by at least two opposing electrode plates between which the reaction product flows.

The electrode plates are ideally substantially parallel, spaced apart by a distance between each electrode surface of between 1 and 5 millimetres, and carry an electrical current density between 2 and 3 amps per square centimetre of electrode surface area. A DC voltage in the range of 80-100 volts is usually sufficient for this purpose.

This electrolytic step regenerates the persulphate electrolyte within the reaction product. The aqueous phase containing it can be separated and, ideally, passed through an ion exchange device to remove sulphates therein, thus yielding substantially uncontaminated persulphate electrolyte that can be recirculated within the process.

The above methods may be applied in an environment at lower than atmospheric pressure. This assists by reducing the effective boiling temperature of the hydrocarbons being processed, allowing heavier fractions to be processed whilst remaining at manageable temperatures. A pressure of 1500 Pa or lower is preferred.

A wide range of hydrocarbons can be treated in this way. Used hydrocarbons such as engine oils and sulphur-contaminated marine fuels are prime examples, but there are a wide range of others such as hydrocarbons derived from the pyrolysis of a material having a hydrocarbon content. One such example is a mix of used rubber (such as end-of-life tyres) and used oils (such as engine oils), which can be pyrolysed together to yield a hydrocarbon liquid which can be treated as above, and a residue that provides a useful solid fuel.

BRIEF DESCRIPTION OF THE DRAWINGS

An embodiment of the present invention will now be described by way of example, with reference to the accompanying figures, in which.

DETAILED DESCRIPTION OF THE EMBODIMENTS

Within this application, the phrase 'contaminant species' is used to mean those chemical compounds and any physical materials that are specifically excluded by species, mass or volume, from any technical specification pertaining to an energy or fuel product deriving from this embodiment. Examples of contaminants include (but are not limited to) Sulphur, halogens, Nitrogen, dissolved metals, chars.

Figure 1:
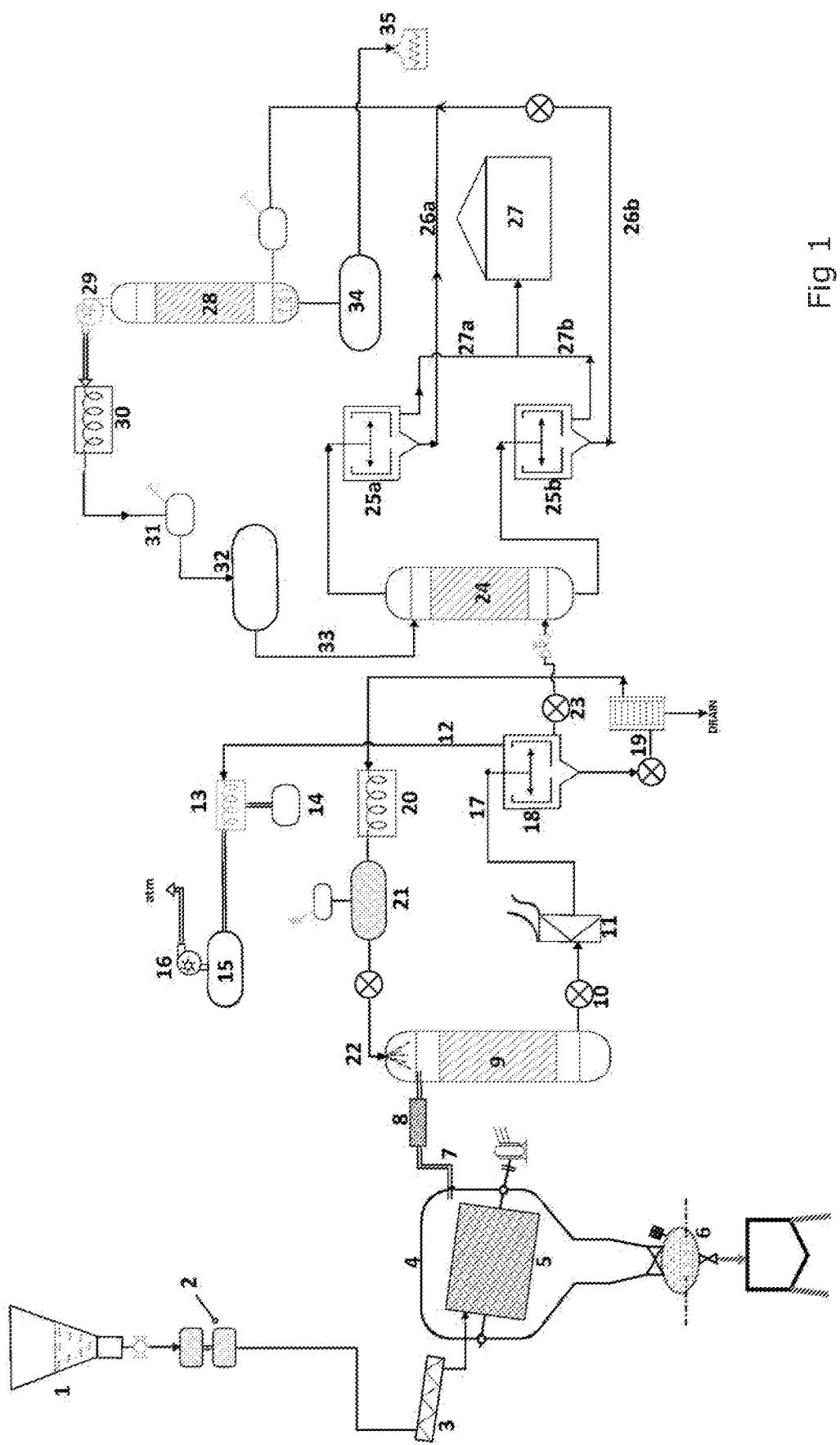
FIG. 1 is a schematic general layout illustrating the process of the invention.

FIG. 1 depicts a scheme comprising vessels, pumps, pipes, heat sources, coolers, separators et al in an illustrative process sequence. It will be readily understood by those familiar with process engineering that variations in process layout are possible without changing the intent of the embodiment. In particular, variations may be made as necessary or desirable to accommodate different starting materials and process aims. However, FIG. 1 illustrates one process route that is operable and embodies the present invention.

Bulk supplies of solid or liquid materials that are to be pyrolysed (or a mixed combination of those materials) are provided to a reservoir 1. This may be insulated and heated if necessary, to assist viscous materials to exist in a form that allows them to pass by gravity or mechanical means. Material in the reservoir 1 passes to an airlock device 2 which is intended to prevent direct connection to atmosphere between the reservoir and the subsequent vessel 4, which might otherwise allow air/oxygen to enter the process and produce conditions whereby combustion could take place. Materials pass from the airlock to a mechanical feed device 3, which in the case of a liquid would be a pump, or in the case of a solid (or a mixture of solids and liquid) may be a pump, or mechanically driven auger, or other such mechanical device. The feed devices are a means of causing the material to be continuously introduced into an externally insulated, internally heated vessel 4 at a controlled rate.

Where solid material is to be pyrolysed, it is desirable to prepare individual pieces to a size that allows the largest possible surface area to absorb the heat available in vessel 4, subject to limitations imposed by the size of pipes, mechanical feed devices and the dimensions of vessel 4. Irregular shaped pieces of material are most advantageous and I have found that pieces having a length to width ratio of between 10:1 and 20:1 are more rapidly pyrolysed.

Where liquid material is to be pyrolysed, that material should be able to achieve a viscosity, by heating or otherwise, that will allow it to flow or to be pumped into vessel 4 at a constant rate, consistent with the ability of the heating source within vessel 4 to match or exceed the enthalpy of vapourisation of the liquid.

Within vessel 4 is a hollow cylinder, tube, or mesh belt arrangement 5 or other mechanical device able to support the material to be pyrolysed whilst that material is subjected to the heat introduced into the vessel 4.

Vessel 4 may be internally heated, and the cylinder 5 may be externally heated by any available heat energy source that will provide a sufficient and continuous level of heat required to maintain the enthalpy of vapourisation within the process. For example, heating may be provided in the form of one or more hollow tubes wound around the internal periphery of vessel 4 or support cylinder 5. The tubes may contain electrical elements, steam, hot gas from combustion or any other heat source that is able to provide radiant or convective heat directly to the pyrolysis material or through the wall of a tube or pipe through which the pyrolysis material passes. The method of heating may be organised to achieve efficiency or in accordance with preference, design, safety or local regulation. It will be evident to the skilled reader that many alternative heating arrangements might be employed without changing the intent of the embodiment.

As the pyrolysis material is heated, it will become thermally degraded to the extent that component gases of the pyrolysed material are released into vessel 4. This is coupled directly to second vessels 8, 9 by a pipe 7 of sufficient diameter so that gases created in vessel 4 may pass freely into subsequent vessels 8 and 9.

The arrangement of vessel 5 may take a multitude of forms. FIG. 1 illustrates a single cylindrical layout, although one practised in the art will understand that there are many potential variations to the method illustrated, such as a moving mesh belt arranged in one or multiple layers, one or multiple fixed or moveable inclined tubes or any other mechanical means of permitting material to travel by gravity or mechanical motion through the heated zone of vessel 4 and such alternative physical and mechanical arrangements are possible without changing the intent of the embodiment.

In the present embodiment, hollow cylinder 5 is supported on a metal shaft and each end of that shaft protrudes through the wall of vessel 4. The vessel housing has a bearing and seal assembly at each end which supports the cylinder shaft and allows it to rotate, oscillate or vibrate by external mechanical means. The cylinder shaft may be inclined at a changeable angle to assist the movement of pyrolysed material through the cylinder during the process or the entire process heating unit may be inclined by mechanical or physical means, or may be placed on an inclined surface to assist the movement of pyrolysed material so described.

The externally mounted cylinder shaft bearings and seals may be air, liquid or otherwise cooled or each shaft may have a non-conducting section included in its length to prevent or reduce excess heat being transmitted along the cylinder shaft.

The cylinder 5 may be constructed from (but not limited to) stainless steel, steel mesh, quartz glass, ceramic, or any other material capable of withstanding the temperatures that are likely to be utilised during the pyrolysis process. In particular, consideration must be given to the material of construction of the cylinder(s) or tubes, as the ability to transfer heat from the external heat source to the material to be pyrolysed (heat transfer coefficient) will directly affect the speed and efficiency of pyrolysis.

The heat transfer coefficient 'h' is the ratio of heat flux 'q' (heat flow per unit area) to the difference between the temperature '$T_s$' of the surface and that of medium to be heated, '$T_a$' and may be stated thus:

$$h = \frac{q}{T_s - T_a}$$

It might be considered that materials with a high heat transfer coefficient such as copper or brass would be preferred, but the temperatures used within the pyrolysis process are likely to be above the softening or melting point of such materials which renders them unsuitable for a pyrolysis process.

The cylinder and any supporting framework should be securely fixed to the cylinder shaft by a mechanical means such as welding, clamping, bolted flange or other secure means.

Where solid materials are pyrolysed, a perforated or mesh cylinder is advantageous as much of the char formed during pyrolysis may pass through the mesh by gravity to be collected at the bottom of the external housing in one or more char storage vessels 6. Alternative mesh patterns and hole sizes may be utilised depending on the type of material being pyrolysed and the char created by that material.

Where liquid material is to be pyrolysed, a non-perforated cylinder is preferred and internally, the cylinder may be fitted with spirals, baffles or guides that will slow the passage of the liquid but promote the movement of any char to the lowest end of the cylinder where it may exit by gravity to be collected at the bottom of the vessel 4 in one or more char storage vessels 6. Multiple cylinders of different construction may be provided within vessel 4, with each cylinder or mesh tube operating with different materials and alternative temperature profiles.

The char storage vessel 6 is fitted with an airlock device, to allow char to be removed from time to time as required, without allowing air/oxygen to enter vessel 4 which might result in conditions allowing rapid uncontrolled combustion. More than one char storage vessel may be provided to allow alternate vessel emptying. A heat exchanger may be located within the char storage vessel to allow heat recovery from the hot char. Commercial systems are available to meet these requirements.

A negative atmospheric pressure (i.e. a partial vacuum) is maintained within the process system by vacuum pump 16. Thus, as gases are formed by pyrolysis in vessel 4 they will naturally create a slightly higher pressure than the negative atmospheric pressure being maintained in the remainder of the process system. As they are formed, therefore, they are caused to immediately flow to vessels 8, 9 via connector tube 7.

To prevent heat loss causing premature condensation of hot gases in pipe 7, an external heating system, such as heating tape and insulation are applied to the pipe external surface so that the pipe and gases within the pipe are maintained as close as possible to the temperature existing within vessel 4.

Within vessel 4, a combination of temperature and reduced pressure will result in an atmospheric equivalent temperature (AET). In other words, volatile components in the material being processed in vessel 4 will be produced at a lower temperature due to the reduction in pressure. The AET is thus the temperature that would be required in order to produce the same effect at normal atmospheric pressure, which will be significantly higher than the actual temperature reached in the vessel 4. Thus, lowering the operating pressure by way of the vacuum pump 16 simultaneously encourages the volatile components to leave the vessel 4 for vessels 8 and 9, promotes the pyrolisation process, and allows operation at a lower temperature thereby reducing the energy demand of the process. The AET may also be rapidly increased or decreased by adjusting the pressure within the process system (by means of a vacuum regulating device), which enables the overall effective process temperature to be increased or decreased at a faster rate than can be achieved by increasing or decreasing the heat energy being input to the system.

It has been found that natural variations in materials entering vessel 4 will cause gas volumes to be generated at varying rates, potentially causing a rapid change in actual pressure within the process system and thus also changing the AET. To maintain the required AET, adjustment of the system pressure may be carried out automatically by a pressure sensing device connected to a pressure regulating device so that as varying gas volumes are produced, the system pressure is automatically adjusted to maintain the required AET.

Thus, it will be evident to the skilled reader that it is possible to achieve a wide temperature range within vessel 4 by employing a combination of negative pressures and heat energy inputs, enabling temperatures to be selected to match the boiling range of any hydrocarbon bearing materials that may need to be pyrolysed in the process of the present invention. An additional advantage of operating the process at reduced pressure is that a lower heat energy input is required into vessel 4 to effectively achieve the same AET.

It is a feature of this embodiment that the temperature flexibility described above causes some materials (gases, biomass, some oils) to achieve a gas phase at a lower temperature than would otherwise be achieved at atmospheric pressure. This enables contaminating species to be processed as described but without heating the hydrocarbon bearing material to a point that might otherwise cause other unwanted changes in the physical characteristics of the end product. An example of this might be where an oil is required to have sulphur contamination removed, but the oil must not be cracked into lighter products.

It is a further feature of this embodiment that where 'torrefaction' of biomass is required, this can be achieved at a low temperature and pressure. Torrefaction of biomass (e.g. wood or grain) is a mild form of pyrolysis at temperatures typically between 200 and 320° C., intended to change the properties of the biomass to provide a better quality product for subsequent processing into bio-oil, or chemical products or for combustion and gasification applications and to provide a dry product without biological activity such as rotting. Fuller details are provided at https://en.wikipedia.org/w/index.php?title=Torrfaction&oldid=797789218. In torrefaction, it is desirable to remove moisture, acid gases, oxygen content and non-condensable gases so that the biomass material is concentrated into a dry, compact form that is lighter and cheaper to transport, store and mechanically handle. In that concentrated form, the biomass has a higher calorific value per kilo. Further, where bio-oil is created from biomass, it is reported that excess oxygen within the bio-oil can cause its rapid degradation. It has been found that by processing biomass through the process of the present invention, excess oxygen is removed from the process stream, obviating the need to hydro-treat the bio-oil to remove excess oxygen.

It is a yet a further feature of this embodiment that oil contaminated with Polychlorinated Biphenyls (PCBs) may be pyrolysed to a temperature above its constituent boiling points so that chlorine compounds within the oil will be oxidised to aqueous soluble chlorate during processing within the system. De-chlorinating the oil will render it harmless as it will then be free of PCB contamination. The oil may be further cracked to a light distillate, making it usable as a safe fuel commodity having a commercial value and separately, removing the need for specialist incineration as is normally required for PCB contaminated oil.

It is a yet a further feature of this embodiment that oils having a low viscosity and/or higher boiling range (above 700 degrees C.) and sometimes described as 'heavy' oils can be effectively processed in combination with other hydrocarbon bearing materials. These heavy oils are likely to have a low proportion of recoverable volatile, low molecular weight compounds, but by pyrolysing the heavy oils in combination with (for example) rubber, the hydrocarbon content of the rubber can be recovered at AET temperatures of 380 to 450 degrees Celsius to leave a char which absorbs the non-boiling heavy oils. The impregnated char so produced, will retain the hydrocarbon content of the heavy oil and (when cooled) it will have a granular form which may be used as a fuel suitable for a solid fuel boiler or used in a gasification boiler to provide heat energy.

It is yet a further feature of this embodiment that oil bearing shale type materials may be directly processed without the need for water or steam pre-heating. The excavated porous solid (or near solid) hydrocarbon bearing material may be loaded into the thermal process (subject to pipework size limitations) as excavated. At the appropriate hydrocarbon boiling point, the hydrocarbon contained within the solid will become a gas and due to the lower pressure within the process, the gas will be drawn out of the porous shale material and will be processed in the same manner as other gases previously described. The hydrocarbon-free shale will be discharged from the thermal process and after heat recovery, may be returned to local ground structures.

Returning to FIG. 1, as described above gases pass through pipe 7 to vessel 8 which may be a fixed or removable section designed to act as a mounting point for temperature, flow and gas sampling sensors. Gases pass from vessel 8 to column 9, which is in the form of a vertical cylinder. The column is similar to a distillation column in that it is packed with chemically inert random packing designed to provide a wide surface area of contact with materials passing through the column. Hot gases are directed into the head of column 9, where they are contacted with a cooled liquid electrolyte by one or more spray nozzles 22. An alternative would be to bubble the gases through the electrolyte. The electrolyte is an aqueous persulphate and contact with the hot hydrocarbon gases activates the electrolyte and causes it to evaporate into multiple gas components which react with the hydrocarbon gases and with each other. The multiple reactions that take place result in the rapid formation, breakdown and conversion of gases including ozone, hydrogen peroxide and superoxides with associated multiple electron exchanges between the gases causing highly reactive radical species to be generated. For the persulphate, we prefer peroxydisulphuric acid ($H_2S_2O_8$); peroxymonosulphuric acid ($H_2SO_5$) can also be used but is less preferred as it is somewhat volatile (i.e. explosive) and therefore usually needs to be made in situ as and when needed. Other persulphate compounds are also effective, such as the salts derived from the corresponding acids—in particular $Na_2S_2O_8$ and $K_2S_2O_8$.

We have found that the continuous flow of hot hydrocarbon gases will react with a continuous flow of fresh electrolyte to provide the conditions necessary for a chain reaction to be established, whereby multiple radical species such as hydroxyl and sulphate radicals are continuously formed. These radical species have a high oxidation potential of 2.8 (V) and 2.6 (V) respectively. By reaction with the radicals so produced, contaminant species such as sulphur preferentially have their molecular structure altered in a first stage oxidation reaction to become sulphones, with a further change of structure to sulphoxides and then to sulphates which are susceptible to dissolving into the electrolyte. Similarly, halogens and nitrogen are transformed to chlorates and nitrates and dissolve into the electrolyte.

The volume of electrolyte contacting the hot gases is controlled to ensure that the gases condense and then pass through the random packing in column 9. The shape and volume of the column is designed so that a continuous volume of electrolyte, uncondensed gases and hydrocarbon condensate is maintained through the vessel to ensure thorough mixing. Gravity and negative system pressure ensure that the oil hydrocarbon condensate, electrolyte and non-condensed gases gather at the bottom of the column and are then pumped (10) through a continuous electrical field in vessel 11, to be described below.

It will be readily envisaged by those familiar with process systems that variations in layout of vessel 9 and the associated pipework are possible. For example, gas may be introduced to the bottom of vessel 9 and allowed to travel in a counter current flow to the electrolyte.

As gas, hydrocarbon condensate and electrolyte pass through column 9 they form a decreasing temperature gradient from the top to the bottom of the column. The lowest temperature within the gradient is controlled to be above the condensation temperature of light gases in the Naphthalene range so that those Naphtha gases are not condensed but remain as gases as they pass through column 9 and through the remainder of the process system until condensed in a subsequent part of the process.

The temperature gradient within column 9 is monitored by temperature sensors mounted within the column. The sensors send signals to the process system to automatically increase or decrease a separate bypass feed of electrolyte to the column 9 to maintain the selected temperature gradient. By controlling the low point of the temperature condensation range, it is possible to control the boiling point of gases allowed to pass through column 9 and to control the hydrocarbon condensate flash point.

As the electrolyte/hydrocarbon condensate/gas mixture enters the reaction chamber 11, it passes between two or more electrode plates. These are connected to a direct current electrical supply, which is set to automatically produce and maintain an electromotive force (EMF) sufficient to cause an electrolysis reaction to occur within the aqueous electrolyte that left the vessel 9. The combined electrolysis—acid or alkali reaction creates a persulphate which partly reacts with water to form hydrogen peroxide, ozone, oxygen and hydrogen. The creation and simultaneous breakdown of multiple compounds and gases within the combined electrolysis—persulphate reaction causes the generation of hydroxyl and sulphate radicals which cause a strong oxidising reaction as described in the first stage oxidation reaction. The second stage oxidation reaction that takes place within vessel 11 oxidises contaminant species within the hydrocarbon condensate and causes sulphates, nitrates, chlorates etc to substantially or entirely dissolve in the aqueous electrolyte.

After the uncondensed gases exit the reaction chamber 11, they pass via pipe 17 to a separator 18. The gas components exit the separator 18 via pipe 12 and are delivered to a chiller 13 to be condensed, collected, and stored in vessel 14 at a sufficient low temperature to maintain them in a liquid state. The condensed Naptha fluid will be a zero-sulphur product suitable for commercial use, or it may pass through an airlock directly to a thermal oxidiser (or other safe combustion device) to be burned to provide process heat.

Non-condensable gases pass through the chiller 13 and are collected in reservoir 15, from where they are extracted through an air lock and directed to a combustion process such as a thermal oxidiser or the like, to be incinerated to provide process heat.

The electrolyte and hydrocarbon condensate separately exit the separator 18, and the electrolyte is passed through an ion exchange mechanism 19 to remove sulphates. The sulphate free electrolyte is then recycled within the process. The hydrocarbon condensate is further processed as described below.

The electrolyte may be an acid or alkali solution, with selection of either medium being dependent on the contaminants to be removed. For hydrocarbon contaminant reactions, an acidic solution has been found to be most effective, with the molarity being calculated on a stoichiometric basis against the mole value sum of the contaminant species requiring to be reacted.

Where dissolved metals are to be removed from a chemical effluent stream, the electrolyte may be either an acid or alkali solution, depending on the dissolved metal that requires removal from the effluent. The molarity of the electrolyte can be calculated on a stoichiometric basis against the volume percent of dissolved metals within the effluent stream.

Production of persulphate is dependent on a number of factors, (a) the molarity of the electrolyte, (b) the EMF applied through the electrolyte to produce persulphate and (c) the electrical conversion efficiency. From Faradays first law, persulphate is generated in proportion to current density which in this embodiment is dependent upon the surface area of the electrodes in reactor 11 and the amount of time that a given volume of electrolyte is in contact with the electrodes.

For example;

An electrode plate of 1 $cm^2$ subjected to 1 amp-hour of current at 90% conversion efficiency (c/e) would generate 3.267 g Persulphate, which would contain 418 grammes of Oxygen which by stoichiometric calculation could oxidise approximately 13 g sulphur. However, other contaminants within the feedstock will also require a stoichiometric balance with the available Oxygen thus reducing the Oxygen available for Sulphur oxidation. There is therefore a requirement to analyse the feedstock before processing so that the total Oxygen requirement can be calculated and sufficient persulphate produced to allow complete processing of the feedstock.

It follows that a 10 $cm^2$ electrode plate subjected to 2 amp-hours of current at 90% c/e would generate 20×3.267 g Persulphate=65.34 g, which at 100 volts dc requires a power input of 0.2 kWh. If the current density is maintained at a fixed rate, then the total power required will be the sum of the current density multiplied by the total surface area of the electrode plates multiplied by the voltage applied to achieve that current density.

Figure 2:
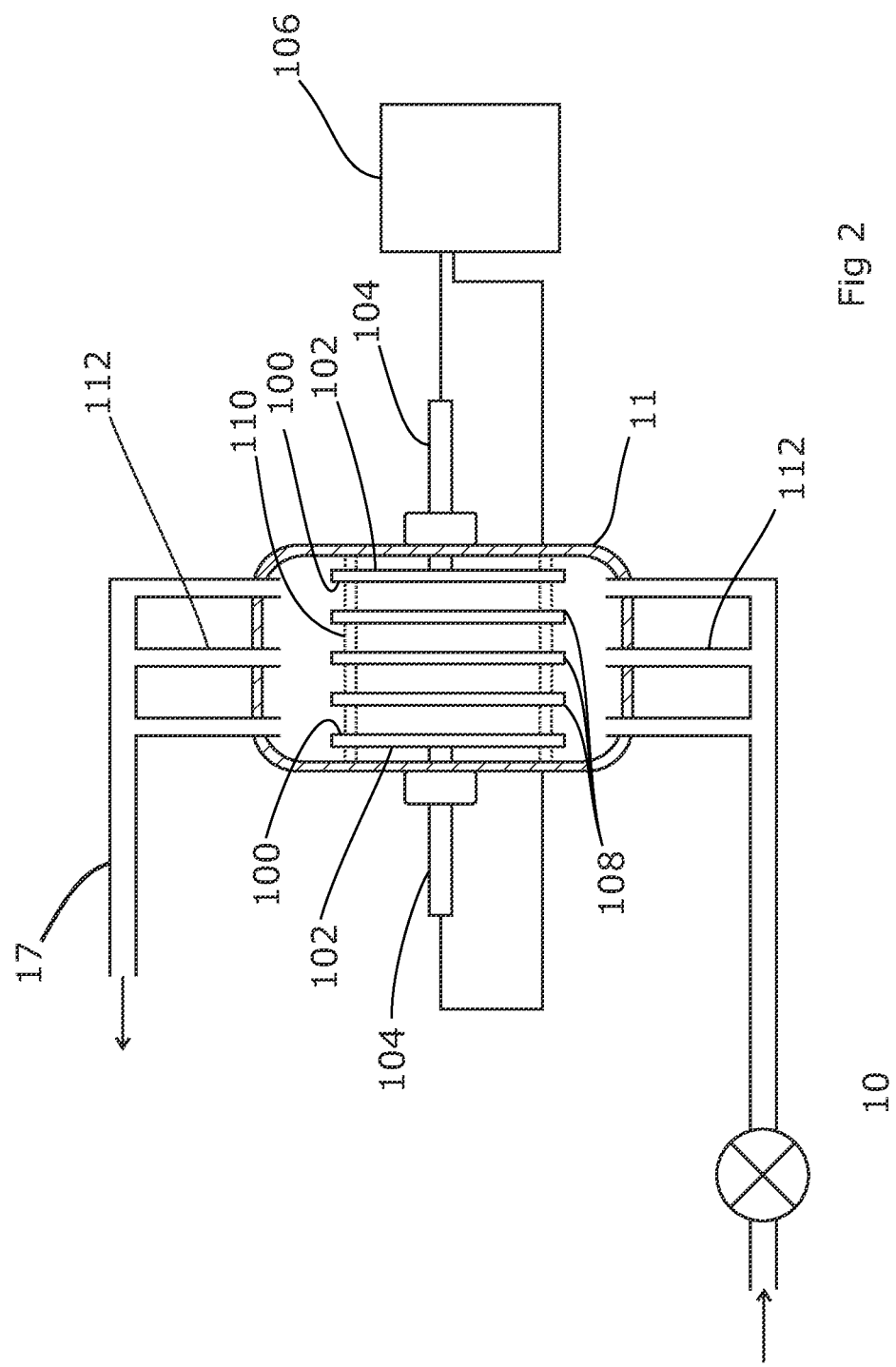
FIG. 2 is a diagrammatic sectional view of the reaction chamber 11.

In this embodiment the reactor 11, shown in FIG. 2, contains two flat plate electrodes 100, each with a surface area of sixteen square centimetres. Each electrode plate is mounted onto a 1 mm thick titanium support plate 102 and bonded to its support plate by means of an electrically conductive, chemically resistant epoxy resin. Each titanium plate is mechanically connected to a metal conductor rod 104, so that an external electrical power source 106 connected to the rod is able to pass an electrical current directly to each electrode plate. Additional electrodes 108 are mounted in between the outer electrodes 100 and are of like construction. These are arranged substantially in parallel with the outer electrodes 100 to which power is applied, provide additional surface area, and help define a flow path between the electrodes 100, 108 and parallel to the electrode surfaces. Each electrode assembly is mechanically mounted in a nylon housing 110 (or such other inert material) suitable for the described purpose and is separated from each other electrode plate by a spacer ring of inert material. Any spacer rings can be replaced with rings of alternative thickness so that the gap between the electrodes can be adjusted as necessary to allow a faster or slower electrolyte volume to pass between the electrodes. It has been found that a distance of between 1 mm and 5 mm between adjacent electrodes provides sufficient variation in electrolyte volume and (within the scope of this example) a gap of 3 mm is preferred. The electrode assemblies are mounted within a leak proof reactor chamber 11, arranged parallel with the direction of flow of fluids and gases, with connections 112 provided at each end of the chamber 11 so that fluids and gases may pass entirely through the reactor chamber with as little restriction as possible. In this example, the electrodes require a direct current electrical supply of up to 48 amps at sufficient voltage to overcome the total ohmic resistance in the circuit. A DC voltage of 80 to 100 volts is typically used, which would require a total input power of 4.8 kW.

The total power requirement can usually be supplied by a commercial DC power supply, ideally having independent voltage and current controls. Additional electrode plates could be provided to increase the available electrode surface area and would require a directly corresponding increase in the DC power supply. It will also be evident that alternative electrodes, mechanical fixings and adjustment arrangements are possible without changing the intent of the embodiment.

The material selected for the electrode plates should provide good electrical conductivity, low ohmic resistance and resistance to oxidation and acids. Carbon/graphite fibre mat, platinum, titanium and boron doped diamond all meet the necessary mechanical requirements as electrodes and are also able to withstand the required current densities without breakdown of electrical continuity. We have found from tests carried out that in the conditions described within this embodiment, boron doped diamond provides the preferred stable performance characteristics.

It might reasonably be assumed that the strongest possible electrical field would be desirable to effect a rapid reaction, but an increase in total electrical input power will cause heat to be generated within the electrodes. Thus a sufficient volume of electrolyte needs to pass over each electrode to ensure that excess heat does not build up to the point where electrode damage might occur. Calculations can be performed locally for each application and the direct current electrical supply applied to the electrodes adjusted to ensure that (i) the current density is sufficient to cause the required persulphate reaction, (ii) heat generated by the electrodes is effectively dissipated by sufficient passing volume of electrolyte and (iii) the molar value of the electrolyte is sufficient to allow the persulphate reaction to proceed efficiently.

There will generally be a considerable variation in the amount of sulphur and other contaminant species within the materials that the present invention is able to process. It is therefore a key aspect of this embodiment that there should be an ability to rapidly vary the current density to increase or decrease the oxidation capability of the process to match higher or lower concentrations of contaminant species as they arise. If low concentrations of contaminants are contained within a feedstock, it would be appropriate to operate the process at less than maximum current density to potentially avoid oxidising useful hydrocarbons. In the example within this embodiment, the maximum current density is required to be more than two amps and less than three amps per square centimetre of electrode surface area, at the lowest voltage that will overcome electrical resistance within the process whilst still maintaining the desired current density. Multiple electrode plates will naturally provide a greater surface contact area to allow for reactions to proceed, but will require proportionately larger power supplies to match the area increase.

To provide efficiency of operation, the process of the present invention has been designed as a two-stage process whereby the first stage of oxidation reaction is at the point of contact between the electrolyte and hot gases and the second oxidation reaction occurs where the hydrocarbon condensate/electrolyte mixture passes through the reactor chamber. It is possible to add further reactors in parallel to provide additional stages of oxidation reaction, but (depending on the materials selected for the electrodes) this may incur disproportionate cost increases which could be significantly detrimental to the commercial performance of the process.

Electrolysis of aqueous solutions does of course produce oxygen ($O_2$) and hydrogen gas (H) from anode and cathode electrodes and the gases are produced directly in proportion to the emf at the electrodes. It will be seen that high potential emfs can be utilised in the embodiment described herein which can cause substantial volumes of $O_2$ and H gases to be generated within the electrolysis chamber. A proportion of these gases are captured within the reaction/electrolysis chamber and directed to recirculate with the electrolyte which potentially allows additional electron reactions to take place as part of the chain reaction described previously. Unreacted gases return through the process flow system and again potentially add to the electron reactions taking place within the generated electrical field. Unrecirculated gases are collected via the vacuum system and directed to a thermal oxidiser or process combustion device where they undergo controlled combustion to create steam for steam turbine power generation or for ongoing process heat.

The mixed hydrocarbon condensate, electrolyte and gas stream emerging from the reactor 11 passes to a separation vessel 18 where the hydrocarbon condensate and aqueous streams are separated by centrifugal action or such other commercial device that separates liquid streams of differing specific gravity. Typically, a centrifuge, hydrocyclone or porous ceramic tube or membrane separation processes (with or without vacuum assistance) are commercially proven processes. The separated electrolyte is pumped from the separation chamber to an ion exchange unit 19 where sulphates are removed and the sulphate free electrolyte passes to a cooling device 20 where the output temperature is automatically cooled and maintained to a temperature of between 5-25 degrees Celsius. The cool electrolyte then passes to a storage tank 21 from where it is pumped (22) to the top of vessel 9 to be reacted with the hot gas as described above. The buffer tank 21 is provided with a pH sensor and airlock device so that the molarity and volume of the electrolyte can be maintained as required. Commercial test kits are available to test Persulphate concentration and, where necessary, a further Persulphate reactor may be provided in circuit with the buffer tank to maintain and adjust the required Persulphate concentration.

The separated hydrocarbon condensate is pumped via valve 23 through a vacuum relief device to a solvent extraction column 24 where it is mixed with a solvent to extract any oxidised contaminant species that have not dissolved into the electrolyte.

Mineral and synthetic oils may absorb metals during normal lifetime use and where oil products are subject to mechanical use and heat, metal ions act as catalysts to oxidise the oil. Oxidation compounds (including dissolved metals) must therefore be removed from the hydrocarbon condensate before it can achieve a recognised fuel or oil specification. Oxidative compounds are naturally polar, and are extracted from the hydrocarbon condensate by first vigorously mixing the hydrocarbon condensate with a polar solvent. This mixing action will attract the polar contaminants out of the hydrocarbon condensate and into the solvent. The method of mixing the oil and solvent will depend on the volume of materials being processed. In a small process installation, a continuous mechanical mixing device may be appropriate, whereas larger oil volumes may require a counter current packed column or other constant flow mechanism that allows intimate contact between the solvent and the oil.

Several polar aprotic solvents are capable of being used to achieve this objective. Examples that have been successfully tested are acetone, acetonitrile, dimethyl formamide and dimethyl sulfoxide. Solvents may be used in a preferred ratio of one-part solvent to one-part hydrocarbon condensate (1:1), although higher and lower ratios may be appropriate depending on the level of contamination removed by the first and second stage electrolyte oxidation process.

After mixing, the solvent and hydrocarbon condensate are separated in a commercial separation process such as a centrifuge 25a, 25b. The solvent passes via pipes 26a, 26b to a commercial recovery process such as a vacuum distillation process (illustrated) comprising a solvent boiling vessel 28, a pump 29 delivering the evaporated solvent to a condenser 30, and a storage vessel 32 to hold the recovered solvent before it is reintroduced into the solvent mixing column 24. A vacuum relief device/valve 31 allows the vacuum on the delivery side of the solvent recovery unit to be released so that the solvent reservoir 32 can be at atmospheric pressure.

The contaminants that were dissolved into the solvent have a boiling point significantly above the boiling point of the solvent, and therefore said contaminants will not pass through the solvent recovery process. This will result in a small volume of contaminant compounds and a viscous hydrocarbon residue remaining within the solvent boiling vessel 28; these residues may be collected in storage vessel 34 and disposed of by controlled combustion for heat recovery 35. Following this separation process, the hydrocarbon condensate is free of contamination and is pumped to a storage vessel 27 prior to use as a clean distillate fuel.

Thus, the present invention provides a process route by which a range of hydrocarbon products can be processed to remove contaminants, especially sulphurous contaminants. It can be applied to crude oils, part refined oils or fuels to produce low-sulphur versions, or it can be applied to end-of-life products such as used engine oil, rubbers and thermoplastics to extract usable hydrocarbon products therefrom.

It will of course be understood that many variations may be made to the above-described embodiment without departing from the scope of the present invention.

The invention claimed is:

1. A method of treating hydrocarbons comprising:
   heating the hydrocarbon thereby to release a gas phase;
   contacting the gas with an aqueous persulphate electrolyte;
   condensing the gas to a liquid or a liquid/gas mixture, and removing its aqueous component; and
   after the condensation step, subjecting the reaction product to an electrical field generated by at least two opposing electrode plates between which the reaction product flows.

2. The method according to claim 1, wherein sulphur-containing impurities in the hydrocarbon are oxidised to sulphates by reaction with the electrolyte.

3. The method according to claim 1, wherein the liquid contains aqueous and hydrocarbon phases, which are separated thereby to remove the aqueous component and to recover the hydrocarbon condensate as a low sulphur fluid.

4. The method according to claim 3 in which the aqueous and hydrocarbon phases are separated by a mechanical means.

5. The method according to claim 1, in which the aqueous persulphate electrolyte is held in a reservoir prior to being contacted with the gas phase hydrocarbon.

6. The method according to claim 5 in which the aqueous persulphate electrolyte in the reservoir is maintained at a temperature of 5 to 25 degrees Celsius.

7. The method according to claim 1, in which the hydrocarbon is supplied in a continuous stream.

8. The method according to claim 1, in which the hydrocarbon is heated in an environment at lower than atmospheric pressure.

9. The method according to claim 1, in which, after separation of the aqueous component, the hydrocarbon residue is mixed with a polar aprotic solvent and then passed to a solvent recovery process.

10. The method according to claim 9 in which the solvent recovery process includes a vacuum distillation step.

11. The method according to claim 1 in which the electrode plates are substantially parallel.

12. The method according to claim 1 in which the electrode plates are spaced apart by a distance between each electrode surface of between 1 and 5 millimetres.

13. The method according to claim 1 in which the electrical current density between the plates is between 2 and 3 amps per square centimetre of electrode surface area.

14. The method according to claim 1 in which the voltage applied across the electrode plates is in the range of 10-100 volts according to the conductivity of the electrolyte.

15. The method according to claim 1 in which an aqueous phase is subsequently separated from the reaction product.

16. The method according to claim 15 in which the aqueous phase is passed through an ion exchange device to remove sulphates therein, to yield a substantially sulphate free persulphate electrolyte.

17. The method according to claim 16 in which the persulphate electrolyte is recirculated within the process.

18. The method according to claim 1, conducted at a pressure below atmospheric pressure.

19. The method according to claim 18, conducted at a pressure of less than 1500 Pa.

20. The method according to claim 1, wherein the hydrocarbon being treated is derived from the pyrolysis of a material having a hydrocarbon content.

21. The method according to claim 20 in which the material is a mix comprising used rubber and used oils, pyrolysed to yield (i) a hydrocarbon liquid for treatment and (ii) a solid fuel.

22. The method according to claim 20 in which the material is a mix comprising used rubber, used oils and a plastics material, pyrolysed to yield (i) a hydrocarbon liquid for treatment and (ii) a solid fuel.

23. The method according to claim 22 in which the plastics material is a thermoplastic material.

* * * * *